(12) United States Patent
Aubin et al.

(10) Patent No.: US 9,106,446 B1
(45) Date of Patent: *Aug. 11, 2015

(54) METHOD AND APPARATUS FOR ASSIGNING AND ALLOCATING NETWORK RESOURCES TO PACKET-BASED VIRTUAL PRIVATE NETWORKS

(75) Inventors: Raymond Aubin, Gatineau (CA); Malcolm Betts, Kanata (CA); Stephen Shew, Kanata (CA)

(73) Assignee: RPX Clearinghouse, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,248

(22) Filed: Jun. 11, 2012

Related U.S. Application Data

(63) Continuation of application No. 12/857,860, filed on Aug. 17, 2010, now Pat. No. 8,199,773, which is a continuation of application No. 11/295,921, filed on Dec. 7, 2005, now Pat. No. 7,787,494.

(60) Provisional application No. 60/633,807, filed on Dec. 7, 2004.

(51) Int. Cl.
*H04L 12/66* (2006.01)
*G06F 15/177* (2006.01)
*H04L 12/46* (2006.01)

(52) U.S. Cl.
CPC .............. *H04L 12/4641* (2013.01); *H04L 12/66* (2013.01)

(58) Field of Classification Search
CPC ......... G06F 15/173; G06F 15/16; G06F 7/00; G06F 17/30; H04J 3/14; H04J 3/22; H04L 12/26

USPC ............ 370/468, 395.21, 390, 392, 396, 397, 370/412, 413, 395.4, 400, 352, 230–235, 370/395.43; 709/220, 215, 219, 221, 222, 709/223, 225, 226, 227, 228, 236

See application file for complete search history.

(56) References Cited

U.S. PATENT DOCUMENTS

| 6,097,722 A | 8/2000 | Graham et al. |
| 6,331,986 B1 | 12/2001 | Mitra et al. |
| 6,950,391 B1 | 9/2005 | Zadikian et al. |

(Continued)

OTHER PUBLICATIONS

Non-Final Rejection mailed Oct. 6, 2008, for U.S. Appl. No. 11/295,921, 10 pages.

(Continued)

*Primary Examiner* — Hanh N Nguyen
(74) *Attorney, Agent, or Firm* — Withrow & Terranova, PLLC

(57) ABSTRACT

A method and apparatus for controlling bandwidth in a Virtual Private Network assigns and allocates transmission bandwidth to packet VPNs for either connectionless or connection-oriented communication. The method creates two views of transmission facilities: a user plane view and a control plane view. In the user plane view, the bandwidth of the transmission facility is split into quantified and identified partitions. In the control plane view, transmission facilities are represented as logical links forming a topology that can be used for the purpose of routing the VPN. The two views are tied together by assigning user plane partitions to VPN control plane links. As a result, the allocation of bandwidth to VPNs becomes a controllable and viewable entity, thereby facilitating management and QoS provisioning in a VPN network.

20 Claims, 6 Drawing Sheets

(56) References Cited

U.S. PATENT DOCUMENTS

| | | | |
|---|---|---|---|
| 7,062,559 B2* | 6/2006 | Yoshimura et al. | 709/226 |
| 7,085,827 B2* | 8/2006 | Ishizaki et al. | 709/223 |
| 7,327,675 B1 | 2/2008 | Goode | |
| 7,359,322 B2* | 4/2008 | Khurana et al. | 370/230 |
| 7,376,084 B2* | 5/2008 | Raghunath et al. | 370/233 |
| 7,382,801 B2 | 6/2008 | Wright et al. | |
| 7,587,512 B2* | 9/2009 | Ta et al. | 709/233 |
| 7,609,637 B2 | 10/2009 | Doshi et al. | |
| 7,652,989 B2 | 1/2010 | Yang et al. | |
| 7,680,934 B2* | 3/2010 | Aubin et al. | 709/226 |
| 7,681,242 B2* | 3/2010 | Green et al. | 726/27 |
| 7,787,494 B1* | 8/2010 | Aubin et al. | 370/468 |
| 7,818,409 B2* | 10/2010 | Chandrashekhar et al. | 709/223 |
| 8,199,773 B2* | 6/2012 | Aubin et al. | 370/468 |
| 2010/0166012 A1 | 7/2010 | Aubin et al. | |

OTHER PUBLICATIONS

Final Rejection mailed Aug. 4, 2009, for U.S. Appl. No. 11/295,921, 10 pages.

Non-Final Rejection mailed Dec. 9, 2009, for U.S. Appl. No. 11/295,921, 13 pages.

Notice of Allowance mailed May 13, 2010, for U.S. Appl. No. 11/295,921, 4 pages.

Non-final Office Action mailed Jul. 14, 2011, for U.S. Appl. No. 12/857,860, 7 pages.

Non-final Office Action mailed Feb. 3, 2011, for U.S. Appl. No. 12/857,860, 7 pages.

Notice of Allowance mailed Feb. 3, 2012, for U.S. Appl. No. 12/857,860, 5 pages.

* cited by examiner

METHOD AND APPARATUS FOR ASSIGNING AND ALLOCATING NETWORK RESOURCES TO PACKET-BASED VIRTUAL PRIVATE NETWORKS

RELATED APPLICATIONS

This application is a continuation of co-pending U.S. patent application Ser. No. 12/857,860, filed on Aug. 17, 2010, entitled METHOD AND APPARATUS FOR ASSIGNING AND ALLOCATING NETWORK RESOURCES TO PACKET-BASED VIRTUAL PRIVATE NETWORKS, which is a continuation of U.S. patent application Ser. No. 11/295,921, filed on Dec. 7, 2005, entitled METHOD AND APPARATUS FOR ASSIGNING AND ALLOCATING NETWORK RESOURCES TO PACKET-BASED VIRTUAL PRIVATE NETWORKS, now U.S. Pat. No. 7,787,494, which claims the benefit of U.S. Provisional Patent Application No. 60/633,807, filed on Dec. 7, 2004, entitled METHOD AND APPARATUS FOR ASSIGNING AND ALLOCATING NETWORK RESOURCES TO PACKET-BASED VIRTUAL PRIVATE NETWORKS, each of which is hereby incorporated herein by reference in its entirety.

BACKGROUND OF THE INVENTION

A packet network generally includes a number of packet switching nodes and transmission facilities between them. Two types of packet communication services are possible: connectionless and connection-oriented. A connectionless network is a type of packet-switched network in which no logical connection is required between sending and receiving stations. Each data unit or packet includes the source and destination addresses and can take any available route between source and destination. The Internet Protocol (IP) is connectionless and packets going to the same destination may take different routes. In contrast, a connection-oriented network generally establishes a fixed association and path between a sender and a receiver. Then, the transport service will guarantee that all data will be delivered to the other end in the same order as sent and without duplication. Communication proceeds through three well-defined phases: connection establishment, data transfer, connection release. The most common examples include Frame Relay (FR) and Asynchronous Transfer Mode (ATM).

A VPN (virtual private network) is a managed service in which secure communication, management, and addressing, equivalent to a private network, is provided on a shared network infrastructure. A VPN customer is the entity that subscribes to a VPN service. A VPN user is an entity of the VPN customer that uses a packet communication service of the VPN.

For example, there are a number of VPN services that enable VPN customers to generate VPN using the Internet as the medium for transporting data. These VPN services use encryption and other security mechanisms to ensure that only authorized users can access the VPN and that the data cannot be intercepted.

VPNs can be implemented in both connectionless and connection-oriented protocols. A VPN uses "tunneling" to encrypt all information at the IP level. One problem with VPNs is that the customer is frequently unable to obtain information about the VPN network; in the case of a connectionless service, the customer and the user of a VPN see that VPN as a cloud; packets are placed into the cloud, and received at the output of the cloud, but the customer and user have little visibility as to what happens to the packet en route to the destination. In the case of a connection-oriented service, they see the VPN as a set of point-to-point connections. In either case, the networking aspects of the VPN are invisible. This situation fits the requirements of small and medium businesses well. However, when a carrier or even a large enterprise subscribes to a VPN service, there is a value in making the internal structure of the VPN itself visible and controllable. Such large customers may want to do some or all of their VPN fault, configuration and performance management themselves. Furthermore, a user in such a customer may want to have more control and more guarantee on the assignment of bandwidth within the VPN, including getting visibility of the VPN topology for the purposes of routing.

SUMMARY OF THE INVENTION

According to one aspect of the invention, a method of building a Virtual Private Network (VPN) in a network comprising a plurality of packet transmission facilities is provided. The VPN is represented by logical links, and the method includes the steps of selecting a set of logical links for the VPN, each logical link in the set being associated with one of the plurality of transmission facilities, wherein each one of the transmission facilities comprises a total bandwidth apportioned into one or more partitions. For each transmission facility associated with each logical link in the VPN set of logical links, a partition of the total bandwidth of the transmission facility is assigned to the respective logical link and each transmission facility controls the forwarding of packets of the VPN in accordance with a bandwidth of the corresponding VPN partition. Such an arrangement allows the bandwidth allocated to VPNs to be controlled in a manner that is visible to a customer.

According to another aspect of the invention, a network device is provided for controlling a VPN Service. The network device includes a computer readable medium and processing logic operable to retrieve information from the computer readable medium to control the generation of a VPN path. The VPN path includes a number of logical links associated with transmission facilities in a network and the transmission facilities have a total bandwidth apportioned into one or more partitions. The computer readable medium of the network device is provided for storing a transmission facility database for storing bandwidth partition information for each transmission facility and a VPN map for mapping logical links of a VPN to partitions of transmission facilities.

According to a further aspect of the invention, a method of establishing a VPN across a transmission facility in a network is provided, the transmission facility having a total bandwidth apportioned into one or more partitions. The method includes the step of receiving, at the transmission facility, a VPN identifier and a partition identifier associated with the VPN, and controlling the forwarding packets of the VPN in accordance with a bandwidth of the corresponding VPN partition.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The present invention is directed to a technique for controlling the allocation of bandwidth among VPNs in a packet network. Using the techniques of the present invention, the VPN bandwidth allocation becomes a quantifiable, accessible metric that may be made available to (and may therefore be controlled by) a customer and/or Provider associated with the VPN.

Figure 1:
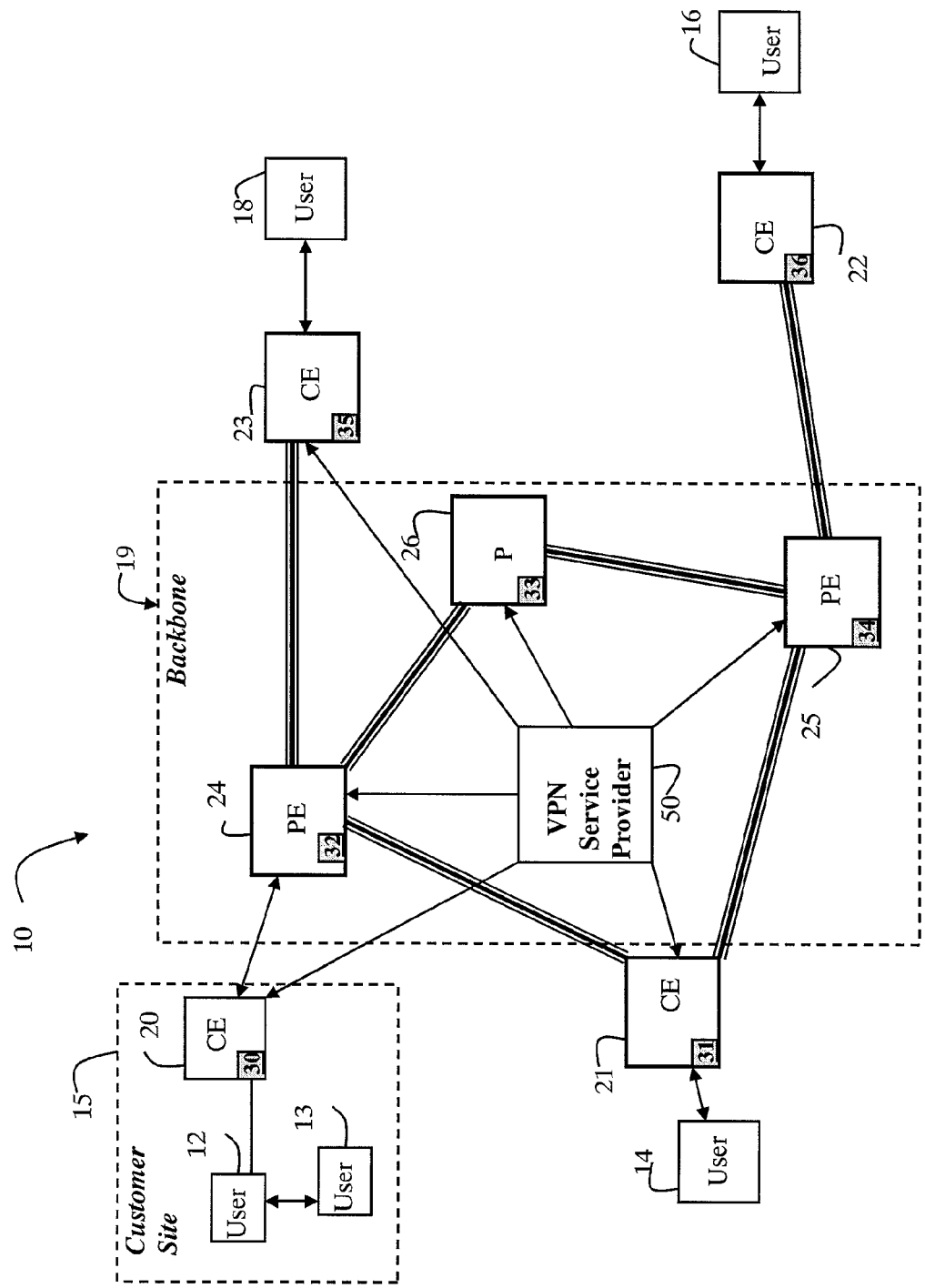
FIG. 1 is a diagram of a network adapted to allocate bandwidth to VPN links in accordance with the present invention.

FIG. 1 illustrates an exemplary VPN network 10 in which the present invention may be implemented. In the VPN network 10, a set of "sites" is attached to a common network which is referred to as the "backbone" 19. A site is a set of IP systems or devices which are capable of communicating with each other without the use of the backbone, such as Users 12 and 13 at Customer site 15. For example, a site may include a set of systems which are in geographic proximity. One or more Customer Edge (CE) devices 12, 14, 16 and 18 are included at each site to enable the site to communicate with the backbone. The Customer Edge device may also be referred to as a gateway device, as it provides the communication path between the attached site (or autonomous system) and the service provider site.

The backbone 19 is a network owned and operated by one or more Service Providers (SPs). The SP's backbone includes one or more Provider Edge (PE) devices 24, 25 in addition to other Provider (P) devices such as device 26 that may be attached only to other P or PE devices, but may not attach to CE devices. The provider devices may include switches, routers, gateways, or other devices capable of forwarding IP traffic. Each P/PE router maintains a separate forwarding table for each VPN. When a packet is received from a particular site, the forwarding table associated with the VPN which the site belongs to is consulted to determine how to route the packet. Each link that couples the P, PE and CE is referred to hereinafter as a transmission facility.

In FIG. 1, for purposes of convenience only, a VPN Service Provider 50 is shown as a discrete entity coupled to each of the CE, PE and P devices. The VPN Service Provider may be implemented as a combination of hardware and software components, and may be embodied in many forms, including as the discrete device 50, shown in FIG. 1, or alternatively may be implemented as functionality layered on any of the PE, P or CE devices. Alternatively, different portions of the VPN SP functionality may be distributed among devices in the VPN network. It should therefore be understood that the present invention is not limited to the specific embodiments illustrated in the figures.

According to one aspect of the invention, the VPN SP allocates and assigns transmission bandwidth to packet VPNs. The VPNs may be VPNs in either connectionless or connection-oriented communication systems, and thus the present invention is not limited to any particular type of packet transport. The VPN allocates bandwidth to a VPN using both a user plane view of transmission facility available bandwidth and a control plane view of transmission facility logical links. A VPN is built by the VPN service by mapping the transmission facility logical links to portions of transmission facility bandwidth. The mapping information (illustrated as block 30-36 in FIG. 1) is then forwarded to each transmission facility to enable appropriate transmission bandwidth utilization for each VPN link.

Figure 2A:
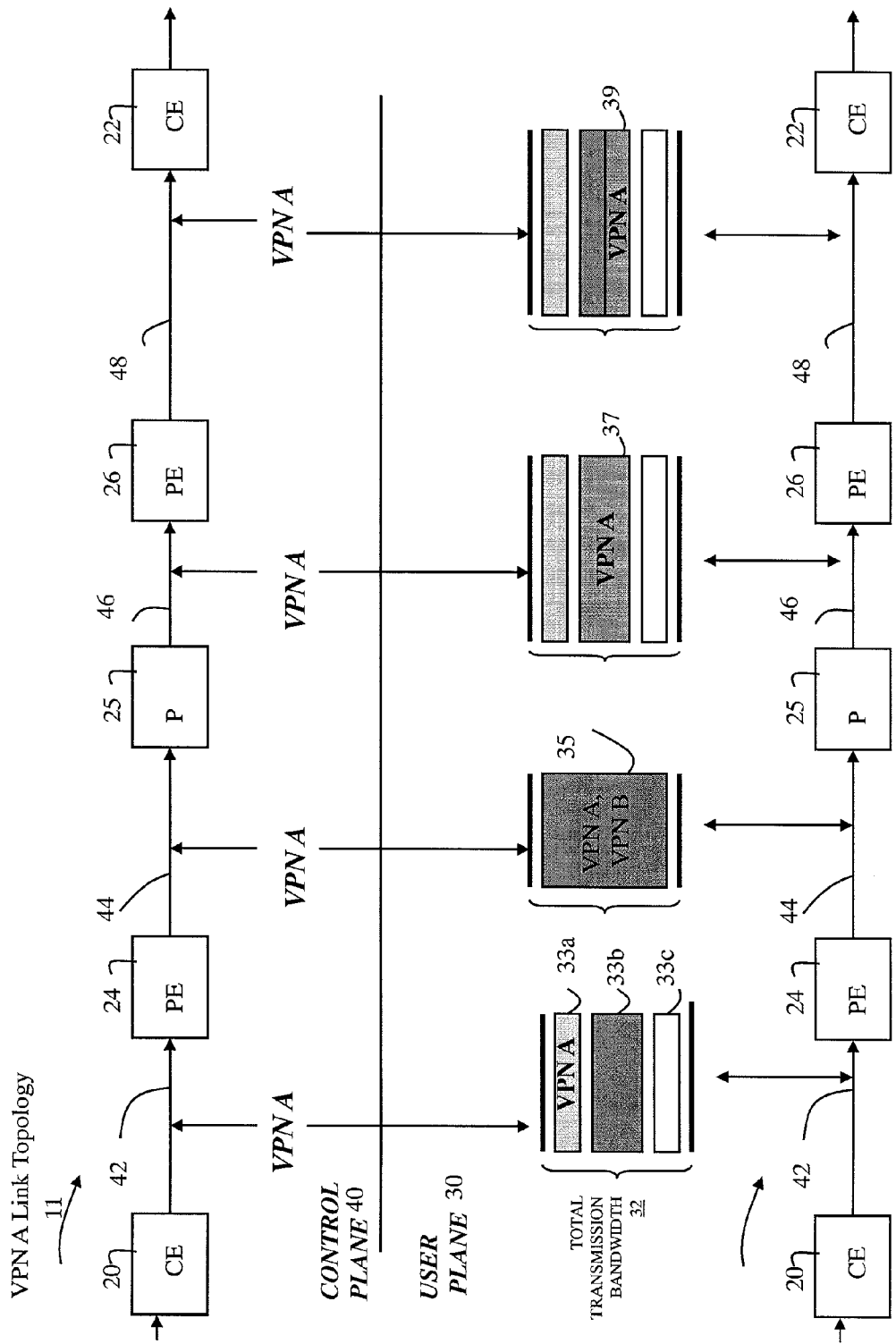
FIGS. 2A and 2B are diagrams describing the architecture used by a VPN Service Provider (VPN SP) of the present invention to allocated transmission facility bandwidth to VPN links.
Figure 2B:
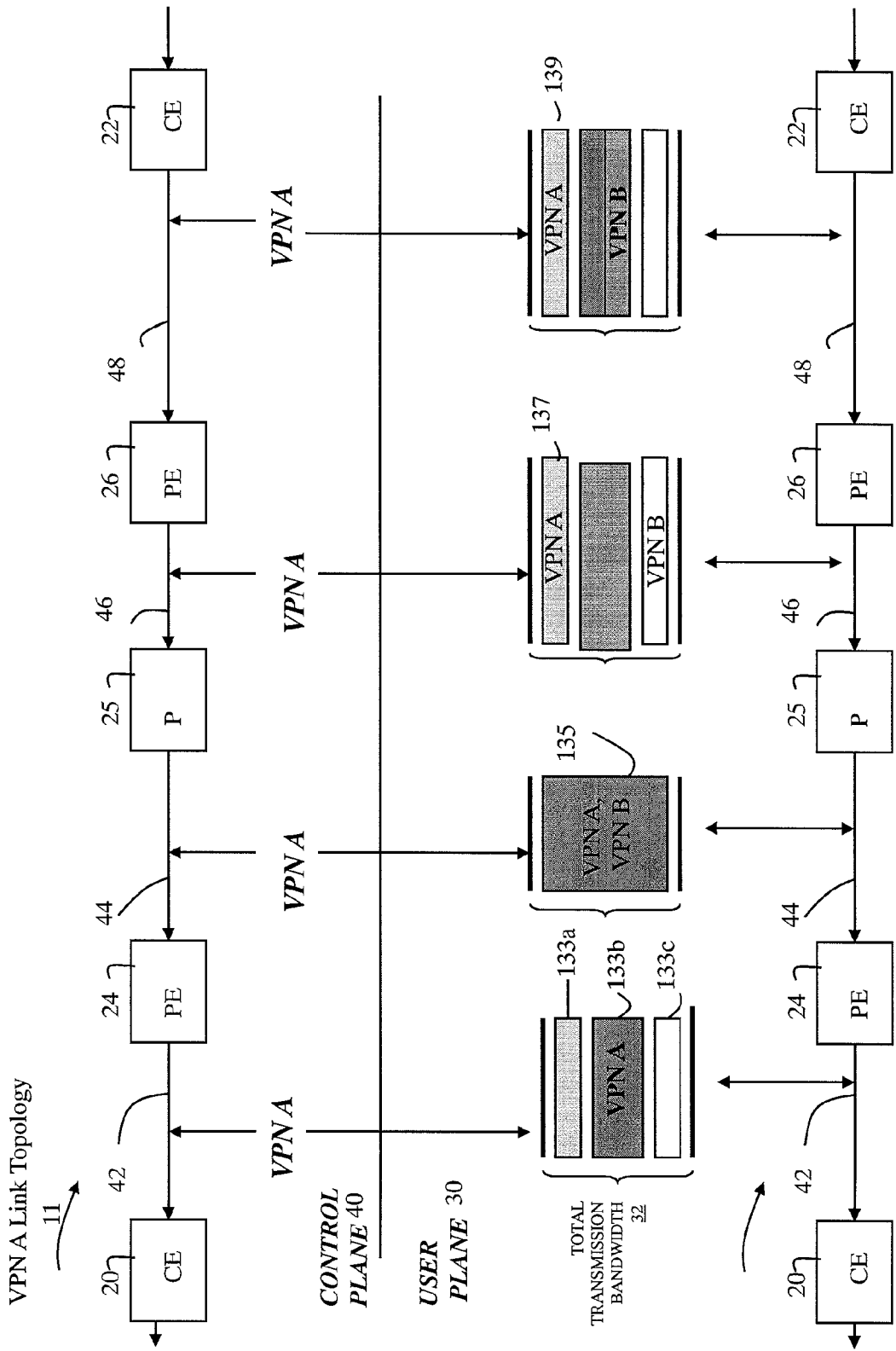

For example, FIG. 2A illustrates a method of viewing a VPN network from the two perspectives of a user plane 30 and a control plane 40. In the user plane 30, the total transmission bandwidth 32 of each transmission facility is apportioned into identified and quantified portions such as 33a, 33b and 33c. The total bandwidth 32 of all of the partitions is equal to the capacity of the transmission facility. As shown in FIG. 2A, each transmission facility may be partitioned at different granularities. A partition in a Transmission Facility represents an allocation of bandwidth to a uni-directional communication flow. As illustrated in FIG. 2B, the bandwidth may be partitioned differently for different directions of communication. The partitions are static and assigned at VPN initialization or reconfiguration.

In essence the partitions identify the amount of bandwidth that is to be allocated to packets or connections assigned to the partition. A partition can be shared by both connectionless and connection-oriented VPNs; the maintenance of the bandwidth allocation for the partition is performed using bandwidth control mechanisms consistent with type of connection. Therefore, in connection-oriented transport systems, admission control mechanism are used to control the amount of bandwidth allocated to each connection to ensure that it is within the partition boundaries. For connectionless systems other traffic management techniques such as traffic shaping and queue management across the partitions can be used to control the bandwidth allocated to VPN packets.

Referring back to FIG. 2A, in the control plane view 40 of the VPN network, transmission facilities are represented by logical links that form a topology that may be used for routing within a particular VPN. VPN logical links are used for carrying VPN traffic through the network. Using this perspective, an example VPN A may be represented by the logical links 11 shown in FIG. 2A. The control plane view and user plane view are tied together by assigning user plane bandwidth partitions to VPN logical links. Thus, as shown in FIG. 2A, logical link 42 of VPN A is mapped to physical partition 33a of transmission facility 42. Accordingly, transmission of packets in VPN A by the CE 20 uses the portion of total CE bandwidth defined by partition 33a. Similarly, link 44 of VPN A is mapped to partition 35, link 46 of VPN A is mapped to partition 37 and link 48 of VPN A is mapped to partition 39.

A VPN logical link has a bandwidth equal to the total bandwidth of all partitions assigned to it. Partitions may be unassigned (referred to as an "unassigned partition", assigned to a single VPN (referred to as a "dedicated partition") or assigned to multiple VPNs (referred to as a "shared partition"). In addition, multiple partitions may be assigned to a single VPN, although this may increase the complexity of VPN traffic control at the device. Because of the possibility of sharing, the total bandwidth assigned to the VPN links may exceed the physical capacity of some of the individual transmission facilities. For example, if both VPN A and VPN B share a partition at transmission facility 44 having an N bit/s partition, then the total bandwidth assigned to VPN links at the transmission facility is 2N bit/sec, twice the physical capacity of the facility.

Figure 3:
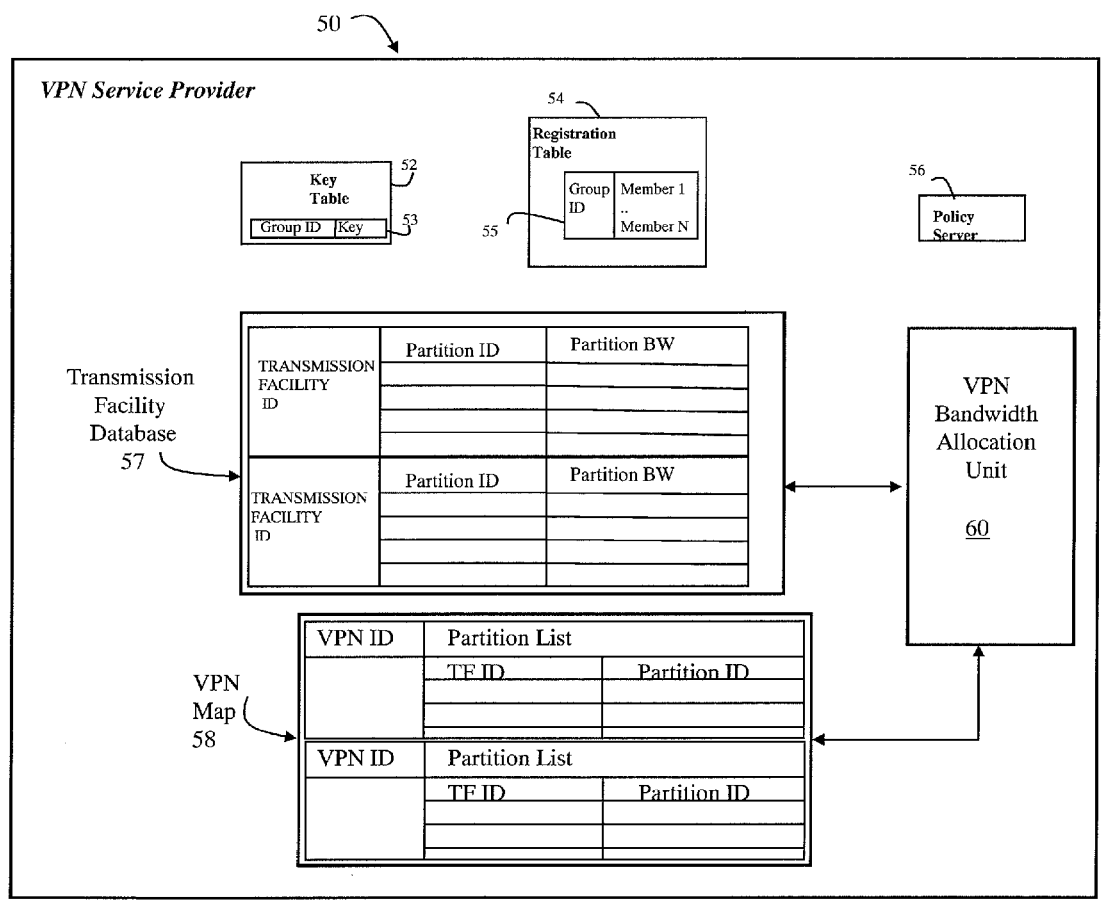
FIG. 3 is a diagram illustrating exemplary components that may be included in a VPN SP of the present invention.

The assignment of the partitions to the VPN is performed by the VPN Service Provider 50. Referring now to FIG. 3, several components that may be included to provide the VPN Service Provider functions of the present invention are shown. It should be noted that the components shown are representative only; the implementation of the functionality of the VPN SP is a matter of design choice, and may be delineated in a variety of manners depending upon selected hardware components and network protocols used in a VPN SP architecture.

A VPN Service provider of the present invention may include known VPN specific functionality, including a key table 52, registration table 54 and policy server 56. The key table 52 includes a number of entries, such as entry 53, which stores a key for each VPN group ID. The key is used by the group for encryption and decryption of packets that are transferred between group members. The registration table 54 is used to identify members of each VPN. As CEs enter and leave the VPN, the registration table is updated to reflect the current VPN members. In the event of a key change or the like, the registration table provides member identification data for transmitting the change to each member of the respective group. The policy server 56 represents both the entity and functions used to create and manage security policies. Although the policy server is shown included as part of the VPN Service Provider, it may be a separate, network administrative entity. It serves to install and manage the security policies related to the membership of a given multicast group and those relating to keying material for a multicast group.

The VPN SP 50 is also shown to include a VPN Bandwidth allocation unit 60, a Transmission Facility Database 57 and a VPN Map 58. The Transmission Facility (TF) database stores partition identifiers and partition bandwidth for each partition of each TF.

The VPN SP 50 also is shown to include a VPN Map 58, storing, for each VPN, a partition list identifying, for each link in a VPN, the mapped transmission facility/partition pair. The TF database and VPN map may be data structures or other objects that are stored on a computer readable medium and accessed by software of VPN SP during a VPN link to partition mapping process, outlined in FIG. 4. Note that the database entries are merely provided as representative examples of information that may be used by the VPN SP to execute the process of FIG. 4, and there is no requirement that an embodiment of the invention have any particular database of any particular form. One advantage of storing the information in the data structures of FIG. 3 is that the partition and associated bandwidth information is stored in a form in which each VPN's resources are visible and controllable by the corresponding VPN Customer.

Figure 4:
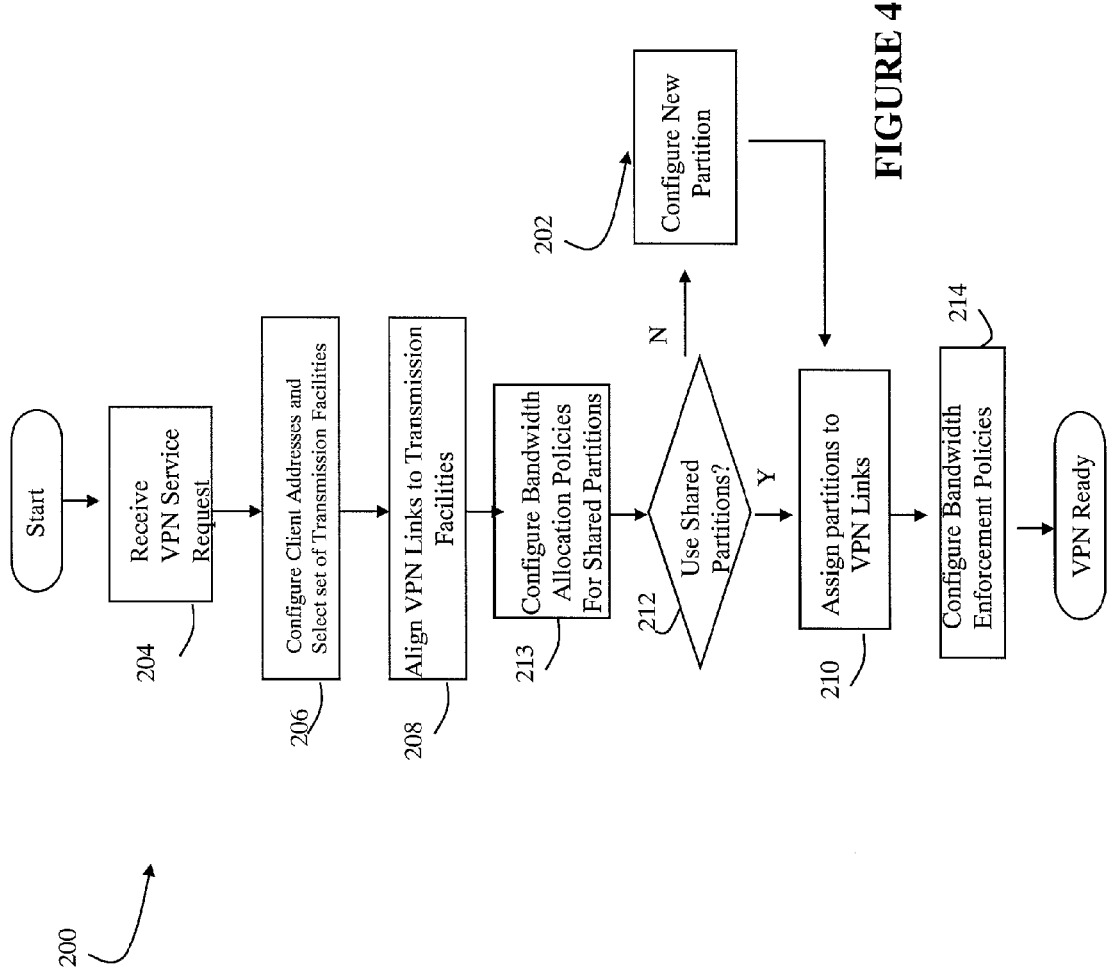
FIG. 4 is a flow diagram illustrating exemplary steps that may be performed by a VPN SP of the present invention.

Referring now to FIG. 4, a process 200 for mapping logical VPN link to physical transmission facility partitions is shown At step 204, the VPN SP receives a request, from a Customer, for a generation of a VPN. At step 206, the VPN SP configures the user's addresses. A set of Transmission Facilities for the VPN are identified in a packet network to ensure that traffic could flow between users of that VPN. At step 208 the SP associates the logical links with the transmission facilities. At step 213, any allocation policies associated with the shared bandwidth are retrieved, and this information is forwarded to the transmission facility. At step 212, it is determined whether any existing partitions on the TFs can be shared with other VPNs. If not new partitions are created at step 202. At step 210, partitions are explicitly assigned to VPN links. Any method may be used to assign a partition to a logical link, including evaluating policy information associated with the link (such as quality of service of traffic on the link, type of traffic on the link (i.e., control vs. data), etc.) At step 214, bandwidth control policies are forwarded to the transmission facilities, for example by forwarding admission control information or traffic management information from the VPN SP to the respective transmission facilities. At this point, the VPN is ready for use by the customer.

Figure 5:
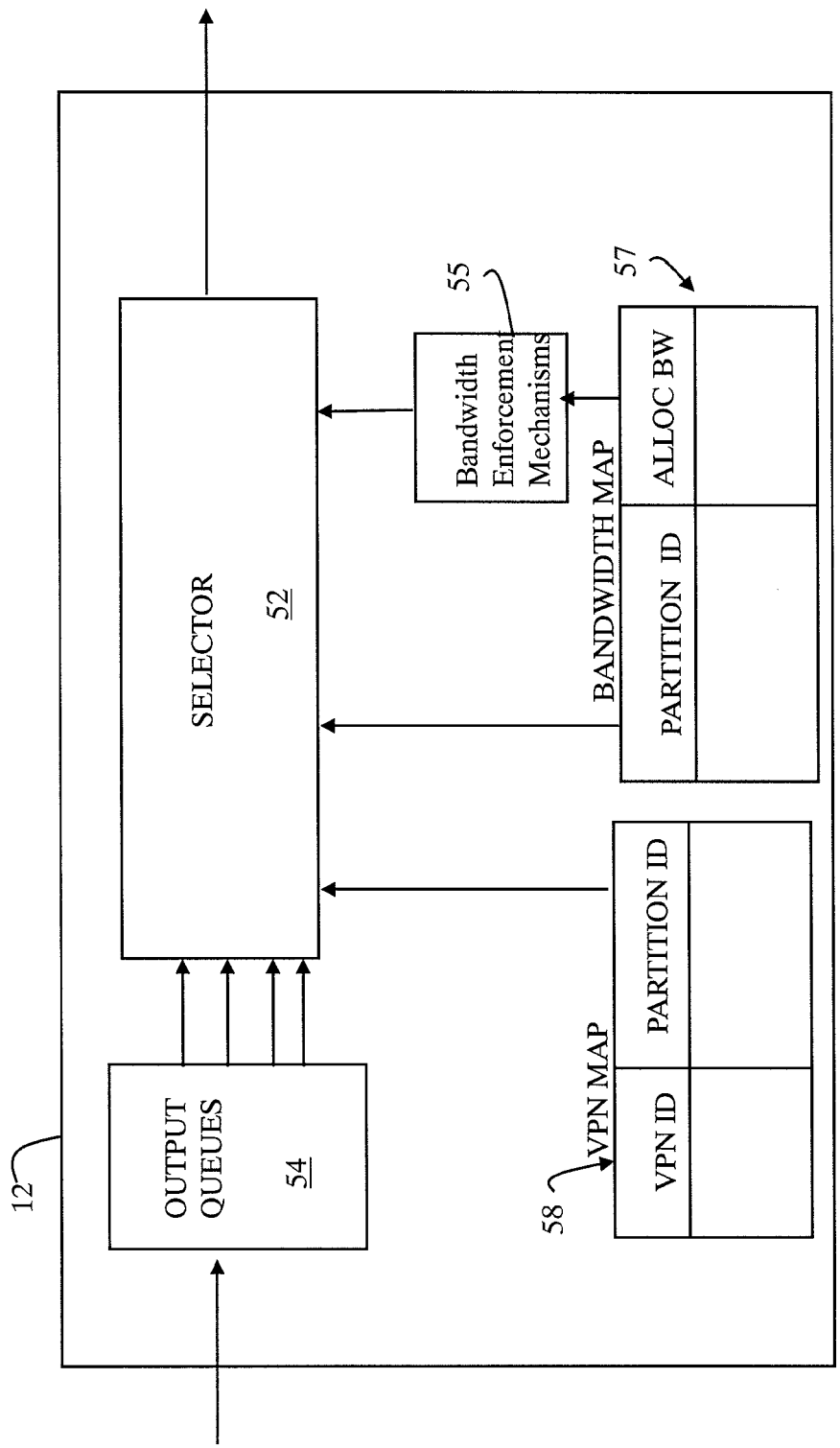
FIG. 5 is a diagram illustrating exemplary components that may be included in a transmission facility supporting the VPN bandwidth allocation method of the present invention.

FIG. 5 illustrates several components that may be included at one end of a transmission facility supporting the present invention. The transmission facility is shown to include a number of queues 54 coupled to a selector 52. The selector 52 controls the forwarding of VPN packets through the TF in accordance with the bandwidth allocated to a partition assigned to the VPN. The bandwidth enforcement mechanism 55 uses bandwidth information associated with the partitions, which may be stored, for example, in data structures such as the VPN map 58 and the Bandwidth map 57. The VPN map maps VPN identifiers to partitions of the TF. The Bandwidth Map stores the particular bandwidth allocation for each partition. The Bandwidth Enforcement mechanism uses this information to control the flow of VPN packets through the Transmission facility in such a manner that VPN packets are forwarded at a rate consistent with the bandwidth of their assigned partition.

Accordingly, a method and apparatus has been described which assigns and allocates transmission bandwidth to packet VPNs for either connectionless or connection-oriented communication. As a result, the allocation of bandwidth to VPNs becomes a controllable and viewable entity, thereby facilitating management and QoS provisioning in a VPN network. The aspects of VPN SP may be implemented in a number of different manners, including as software centrally instantiated in one or transmission facilities or as distributed code instantiated in the various network elements configured to implement the VPN SP functions. It should be understood that all functional statements made herein describing the functions to be performed by the methods of the invention may be performed by software programs implemented utilizing subroutines and other programming techniques known to those of ordinary skill in the art.

When the VPN SP functions are implemented in software, the software may be implemented as a set of program instructions configured to operate in control logic on a network element that are stored in a computer readable memory within the network element and executed on a microprocessor. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system for operating a virtual private network (VPN) service, comprising:
 a transmission facility database configured to store bandwidth partition information for at least one transmission facility; and
 a VPN map configured to map at least one VPN logical link of at least one VPN to at least one bandwidth partition of the at least one transmission facility;
 wherein the at least one transmission facility is configured to provide selective customer access to the VPN map and the transmission facility database, wherein the selective customer access enables a customer to view the VPN map.

2. The system of claim 1, wherein the at least one transmission facility is configured to provide to a particular customer associated with a particular VPN an indication of utilization of bandwidth of the at least one bandwidth partition for at least one VPN logical link of the particular VPN.

3. The system of claim 2, wherein the at least one transmission facility is configured to provide the indication of utilization of bandwidth based on information in the transmission facility database.

4. The system of claim 1, wherein the at least one transmission facility is configured to enable a particular customer associated with a particular VPN to access the VPN map to assign at least a portion of the at least one bandwidth partition of the at least one transmission facility to the particular VPN.

5. The system of claim 4, wherein the at least one transmission facility comprises a VPN bandwidth allocator.

6. The system of claim 1, further comprising a key table configured to store encryption keys associated with VPNs provided by the VPN service.

7. The system of claim 1, further comprising a registration table configured to store customer edge equipment identifiers associated with VPNs provided by the VPN service.

8. The system of claim 1, further comprising a policy administrator configured to administer security policies for VPNs provided by the VPN service.

9. The system of claim 1, implemented on at least one discrete entity coupled to provider network devices and customer network devices.

10. The system of claim 1, implemented on at least one provider network device coupled to other provider network devices and customer network devices.

11. The system of claim 1, implemented as functional elements distributed among multiple network devices configured to provide the at least one VPN.

12. The system of claim 1, wherein the VPN map stores, for each VPN provided by the VPN service, a list of bandwidth partitions of transmission facilities assigned to each VPN.

13. The system of claim 1, wherein the transmission facility database stores, for each transmission facility associated with the VPN service, a list of bandwidth partitions and the bandwidth associated with each bandwidth partition.

14. The system of claim 1, further comprising transmission facility control elements at each end of each transmission facility associated with the VPN service, the transmission facility control elements being configured to control entry of VPN traffic associated with each VPN served by each transmission facility.

15. The system of claim 14, wherein the transmission facility control elements at each end of each transmission facility comprise:
 at least one queue configured to queue VPN traffic entering the transmission facility; and
 at least one selector configured to select the VPN traffic from the at least one queue for transmission by the transmission facility, the at least one selector being configured to select the VPN traffic in accordance with bandwidth partitions allocated to each VPN served by each transmission facility.

16. The system of claim 15, wherein the at least one selector is controlled in accordance with:
 the VPN map configured to associate bandwidth partitions with each VPN served by the transmission facility; and
 a bandwidth map configured to store bandwidth allocations associated with each bandwidth partition.

17. A method of operating a virtual private network (VPN) service, comprising:
 storing, in a transmission facility database, bandwidth partition information for at least one transmission facility;
 configuring a VPN map to map at least one VPN logical link of at least one VPN to at least one bandwidth partition of the at least one transmission facility; and
 providing, by the at least one transmission facility, selective customer access to the VPN map and the transmission facility database, wherein the selective customer access enables a customer to view the VPN map.

18. The method of claim 17, wherein the at least one transmission facility is configured to provide to a particular customer associated with a particular VPN an indication of utilization of bandwidth of the at least one bandwidth partition for the at least one VPN logical link of the particular VPN.

19. The method of claim 18, wherein the at least one transmission facility is configured to provide the indication of utilization of bandwidth based on information in the transmission facility database.

20. The method of claim 17, wherein the at least one transmission facility is configured to enable a particular customer associated with a particular VPN to access the VPN map to assign at least a portion of at least one bandwidth partition of the at least one transmission facility to the particular VPN.

* * * * *